April 6, 1937.  J. L. BARR  2,075,926
PARKING DEVICE
Original Filed Dec. 23, 1932  2 Sheets-Sheet 1
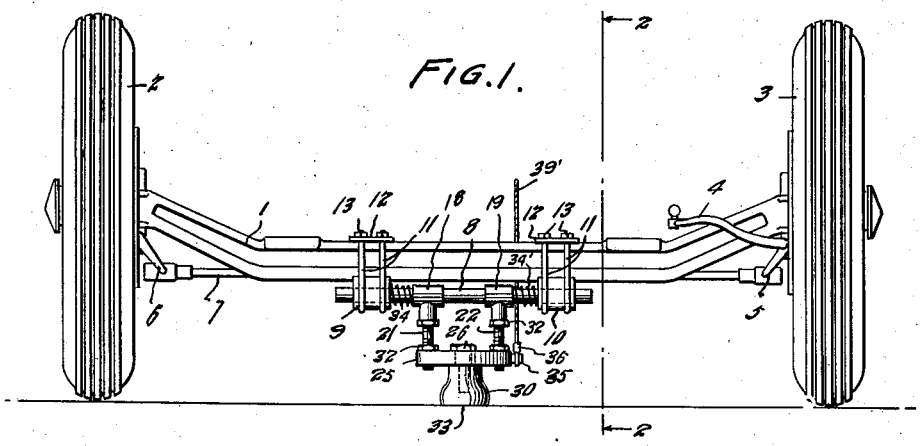
FIG. 1.
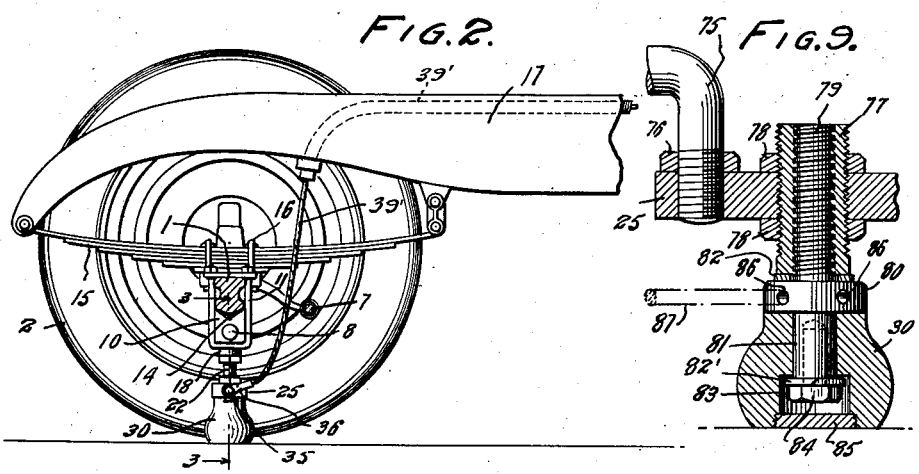
FIG. 2.  FIG. 9.
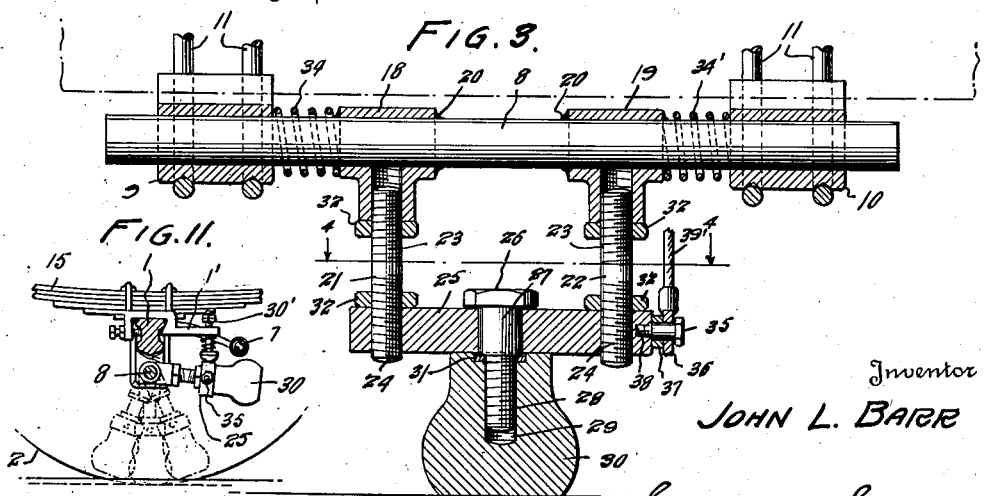
FIG. 3.
FIG. 11.
Inventor
JOHN L. BARR
By Semmes & Semmes
Attorneys April 6, 1937.    J. L. BARR    2,075,926
PARKING DEVICE
Original Filed Dec. 23, 1932    2 Sheets-Sheet 2

Inventor
JOHN L. BARR

Patented Apr. 6, 1937

2,075,926

UNITED STATES PATENT OFFICE 2,075,926

PARKING DEVICE

John Lester Barr, Chevy Chase, Md.

Application December 23, 1932, Serial No. 648,649
Renewed January 22, 1937

20 Claims. (Cl. 280—150)

This invention relates in general to lifting appliances and more particularly has reference to a parking device for automobiles.

This application discloses an improvement over the devices shown in my following copending applications:

Ser. No. 350,685, filed March 28, 1929, now Patent #1,967,219, dated July 24, 1934; Ser. No. 357,254, filed April 22, 1929; Ser. No. 363,172, filed May 15, 1929, now Patent #1,954,308, dated April 10, 1934; Ser. No. 393,490, filed Sept. 18, 1929, now Patent #1,963,879, dated June 19, 1934; Ser. No. 480,511, filed Sept. 8, 1930, now Patent #1,969,198, dated Aug. 7, 1934, and Ser. No. 629,691, filed Aug. 20, 1932.

I disclose generally in these foregoing applications a novel support for mounting on the underside of the end of a vehicle carrying the steering wheels, whereby the wheels may be elevated or the weight of the vehicle thereon relieved to a substantial degree, by either backward or forward movement of the vehicle. This enables free turning of the steering wheels so that a vehicle may be maneuvered in or out of a restricted parking space with greater facility than is now possible.

For accomplishing this purpose I have provided a variety of supports and mechanism which have generally been adapted to engage the road surface, across or on each side of the longitudinal axis of the vehicle.

In my present application I disclose a support having a single leg for a one point suspension, and having an enlarged surface contact portion. A rigidly constructed support structure mounted for swinging movement to the front and rear on a vehicle axle is effective for assisting in the parking of a vehicle, but it is often subjected in operation to twisting and sidewise forces and I have compensated for these, for example, as is also shown in my applications 357,254 and 480,511. In my present support I have provided another construction which is free to twist and give sidewise without straining the structure or its mounting or the roadbed. A rotatable support leg is employed, and the support may embody a jack structure.

An object of this invention is to provide a support for elevating or relieving the weight on the steering wheels of a vehicle so that the same may be turned freely, by forward or backward movement of the vehicle, mounted on the axle carrying the steering wheels on each side of the longitudinal axis of the vehicle.

Another object of this invention is to provide a support for elevating or relieving the weight on the steering wheels of a vehicle by forward or backward movement of the vehicle, adapted to engage the road surface at one point, and all on free turning of the vehicle.

Still another object of this invention is to provide a support for elevating or relieving the weight on the steering wheels of a vehicle so that the same may be turned freely by forward or backward movement of the vehicle adapted to compensate for twisting and sidewise movement.

Still another object of this invention is to provide a support for elevating or relieving the weight on the steering wheels of a vehicle so that the same may be turned freely by forward or backward movement of the vehicle, having a rotatable surface contact member.

Still another object of this invention is to provide a support for elevating or relieving the weight on the steering wheels of a vehicle so that the same may be turned freely by forward or backward movement of the vehicle, adapted to compensate for sidewise movement and automatically recenter at a point in a plane with the longitudinal axis of the vehicle.

A further object of this invention is to provide a support for elevating or relieving the weight on the steering wheels of a vehicle so that the same may be turned freely by forward or backward movement of the vehicle, and extensible or retractable.

A still further object of this invention is to provide a support for elevating or relieving the weight on the steering wheels of a vehicle so that the same may be turned freely, by forward or backward movement of a vehicle, and embodying a jack.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which, for the purpose of explanation, have been made the subject of illustration.

In the drawings:

Fig. 1 is a front view of the novel support forming the subject matter of this invention, shown mounted on the underside of a vehicle axle carrying the steering wheels.

Fig. 2 is a side view of the support and mounting.

Fig. 3 is a front view of the support and mounting, in section.

Fig. 4 is a top view taken on line 4—4 of Fig. 3.

Fig. 5 is a front sectional view of a modified form of support and mounting.

Fig. 6 is a side view taken on line 6—6 of Fig. 5.

Fig. 7 is a front view partly in section, of another modified form of support.

Fig. 8 is a top view of the support taken on line 8—8 of Fig. 7.

Fig. 9 is a fragmentary sectional view of a modified form of support embodying a jack.

Fig. 10 is a front view of another modified form of support.

Fig. 11 is a side view of the support and mounting, indicating the mode of operation, and showing a bumper.

Referring more particularly by numerals to the drawings, in which the same and similar elements are designated by like symbols of reference throughout, and more especially to Fig. 1, there is shown an axle 1 of a vehicle having steering wheels 2 and 3 mounted thereon. The wheels are adapted to be turned in the conventional manner through actuation of a steering arm 4 fixed on an arm 5 operating with the wheel 3 and connected to a similar arm 6 on the wheel 2 through a tie rod 7.

In maneuvering in and out of a restricted parking area it is usually necessary to turn the steering wheels of a vehicle several times while the wheels are at rest. This is a difficult and tiring task, as unless a vehicle is moving it is hard to turn the wheels.

In my several applications already referred to I have disclosed devices for overcoming this difficulty. These devices are in the nature of supports for optional use whereby the steering wheels of a vehicle may be elevated or the weight of the vehicle thereon relieved to a sufficient degree to allow easy turning of the wheels.

The supports generally have been pivoted to the end of the vehicle carrying the steering wheels for swinging backward and forward, whereby on backward or forward movement of the vehicle the end thereof carrying the support is adapted to ride upon the support. While the support may be of such a length as to provide for elevation of the steering wheels to any degree, it is generally deemed sufficient to merely provide for relieving the weight on the steering wheels to a sufficient degree for allowing free turning of the wheels. In this connection a jack may be embodied in the support to provide for further elevation of the wheels when an end of a vehicle is resting on the support, or the support may be made extensible and retractable.

The support disclosed herein comprises a bar 8 adapted to be mounted on the underside of the axle 1 across the longitudinal axis of a vehicle. The ends of the bar 8 are extended through apertures provided in bearing blocks 9 and 10. The bar 8 is adapted to slide as well as rotate in the bearings 9 and 10. The bearing blocks may be secured to the axle in any suitable manner, for example by U bolts 11 extending through receiving plates 12 and fixed by nuts 13. The bearings may be provided with V channels 14, as shown in Fig. 2, for receiving a portion of the axle, or otherwise constructed to accommodate different forms of axles.

In Fig. 2 there is also shown a conventional spring 15 fixed across the axle by U bolts 16 in the usual manner and having the ends secured to a frame member 17.

The bar 8, as is better shown in Fig. 3, is adapted to extend through T members 18 and 19 spaced and positioned on each side of the center of the bar and fixed thereto for example by welding, as indicated at 20. The angular projections on the T members are internally threaded for receiving the top ends of bars 21 and 22, oppositely threaded at each end as at 23 and 24. The lower ends of the bars 21 and 22 are adapted to engage in threaded apertures provided on each end of a cross plate 25.

The plate 25 is further provided with a central aperture for receiving a bolt 26 having the body portion 27 thereof adapted to rotate in the aperture, and provided with an integral threaded extension 28 for screwing in a central threaded aperture 29 provided in a pear shaped surface contact member 30. The threaded extension 28 on the bolt is fixed to the surface contact member 30 by a lock washer 31 fitted in a recess provided in the top of the contact member.

The bars 21 and 22 are fixed with respect to the T members 18 and 19, and the cross plate 25 by lock nuts 32. It will be appreciated that the support structure may be extended or retracted by unscrewing the nuts 32 and rotating the bars 21 and 22, the ends of which, as already pointed out, are oppositely threaded.

It will be particularly noted that the contact member 30 which is free to rotate with the bolt 26, with respect to the plate 25, has an extended surface contact area 33. The contact member is preferably composed of metal, but may be semi-hard rubber or any other suitable material, or may be composed of metal and provided with a rubber shoe.

The bar 8, as already pointed out, is free to rotate in the bearings 9 and 10, carrying the T members 18 and 19, bars 21 and 22, plate 25 and contact member 30 therewith. The bar 8 is also free to slide in the bearings 9 and 10. The bar 8 is normally held centered however by helical springs 34 and 34', encircling the bar and abutting against the bearings 9 and 10 and T members 18 and 19.

The support is adapted to be lowered and raised by a cable, as shown in Figs. 1, 2 and 3, attached to one end of the plate 25 by a bolt 35 extending through an eyelet 36 fixed on the end of the cable, and a washer 37, and having a reduced threaded extension 38 for engaging in a threaded aperture in the end of the plate. The cable may be enclosed in a conduit 39 and the cable or conduit, or both, positioned in any suitable manner.

When it is desired to employ the support, the structure is lowered from the normally raised position, as indicated in Fig. 11, for free swinging movement, by release of the cable designated by the numeral 39'. The end of the vehicle carrying the support is adapted to ride up thereon, by backward or forward movement of the vehicle, with swinging of the support across the vertical, the contact member 30 engaging the road surface to enable free turning, when movement of the vehicle is continued to ride off the support, and the operation repeated reversely. The support is normally held up in inoperative position by fixing of the cable 39', in the operating compartment of the vehicle. In order to prevent rattling an adjustably tensioned plunger 30' may be mounted on the axle, for example by a clamp, and the support held thereagainst by tightening of the cable 39'. Pull forces exerted on the cable are thus compensated for when the vehicle moves with respect to the axle on the springs.

If twisting or sidewise forces are exerted when an end of a vehicle is raised on the support, for example by reason of the steering wheels being positioned at an angle, the twisting forces are compensated for by reason of the contact member 30 being free to rotate. Sidewise forces are compensated for by reason of the bar 8 being free to slide in the bearings 9 and 10. The bar 8, as already pointed out, is normally adapted to be held centered by the springs 34 and 34'.

The fact that the device is so constructed as to permit lateral motion of the vehicle to be absorbed during a lifting operation in combination with the rotatable foot which will absorb twisting strains relieves the device of dangerous stresses which would otherwise weaken the structure and materially reduce its life. Moreover, scoring of the roadway is minimized by the structure just defined.

In Fig. 5 there is shown a modified form of support in which the ends of the bar 8 are reduced as at 40 and 41 for fitting in apertured blocks 42 and 43 adapted to slide in apertures square in cross section, as is also shown in Fig. 6, in bearing blocks 44 and 45, substituted for the blocks 9 and 10. Strips 46 and 47 are fixed against the top walls of the blocks 44 and 45 and roller bearings 48 are adapted to be interposed between the strips 46 and 47 and the tops of the blocks 42 and 43. Collars 49 and 50 are fixed on the reduced ends of the bar 8 to carry the blocks 42 and 43 therewith and washers 51 and 52 are fixed against the adjacent faces of the bearing blocks 44 and 45 for holding the outer ends of the springs 34 and 34'.

A bearing structure is also provided for the contact member 30. A locking pin 31' is provided and a web member 53 substituted for the cross plate 25. The top face of the contact member and the underside of the web member are provided with opposite annular grooves for receiving ball races 54 and 55, with ball bearings 56 interposed therebetween. The use of ball or roller bearings or both, as shown in Figs. 5 and 6, in place of the bearings shown in Figs. 1–4 is of course optional, these being intended to further compensate for twisting and sidewise forces which may be exerted on the support and its mounting.

In Figs. 7 and 8 is shown another modified form of support in which the bar 8 and the cross plate 25 are eliminated and side bars 57 and 57' oppositely bent at right angles at each end substituted therefore. Collars 58 and 59 are formed on the top ends which are adapted to rotate and slide in the bearing blocks 9 and 10 for retaining the inner ends of the springs 34 and 34'. The members 57 and 57' are integrally formed and flattened in the central portion, as indicated at 60 in Fig. 8, and provided with an aperture for receiving an external sleeve 61 adapted to be fixed in the aperture by lock nuts 62 engaging the sleeve on each side of the flattened portion 60. The sleeve 61 is provided with an integral collar 63 on its lower end for resting on the top of the contact member 30 and the sleeve secured to the contact member by a bolt 64 having the body portion 65 adapted to rotate in the sleeve and provided with a reduced extension 66 for fixedly engaging the threaded aperture 29 in the contact member, which is thus free to rotate with respect to the sleeve. The cable 39' is secured in the periphery of the collar 63 in place of the cross plate 25 by a bolt 67 having an integral collar 69 on the central portion, the eyelet 36 being secured by a nut 70.

In Fig. 10 there is shown another modified form of support in which one T member is dispensed with and a single T member 71 centrally positioned and fixed on the bar 8. The cross plate 25 is also eliminated and a collar 72 substituted therefor. The arms 21 and 22 are dispensed with and a single threaded leg 73 employed fixed at the bottom to the top of the collar 72 and the top end screwed in the angular projection on the T member, which is internally threaded, and fixed by a lock nut 74, being thus extensible or retractable. The contact member 30 is attached to the collar 72 so that it is free to rotate with respect thereto.

In Fig. 9 there is shown a modified form of arrangement for mounting the contact member 30 on the support, which is adaptable to any of the constructions described, wherein a jack is embodied in the structure. The member 75 is indicative of one arm having the lower end engaged in an aperture in one end of the cross piece 25 and fixed by a lock nut 76.

An externally threaded sleeve 77 is centrally fixed in the aperture in the cross piece by lock nuts 78. The sleeve 77 is also internally threaded for receiving the top end of a spindle 79 formed with a collar 80 adjacent its lower end and an extension 81. A lock washer 82 is adapted to be interposed between the collar 80 and the lower end of the sleeve 77. The underside of the collar 80 is adapted to rest on the top of the contact member 30 and the extension 81 fit in an aperture in the contact member, which may rotate with respect to the extension. The contact member is secured to the extension by a washer 82' fitted in a recess 83 on the underside of the central member and held by a bolt 84 screwed in the end of the extension, the recess 83 being closed by a closure 85 screwed thereon.

The collar 80 is provided with peripheral apertures 86 for selectively receiving the end of a bar 87 for rotating the collar. The collar may thus be rotated by the bar with respect to the contact member 30 which is free to turn with respect thereto so that it will remain stationary. Rotation of the collar, however, will rotate the spindle on which it is formed so as to elevate or lower the sleeve 77 in which it is screwed.

There is accomplished by this invention a parking device whereby the weight on the steering wheels of a vehicle may be sufficiently relieved, or the same elevated to allow free turning and twisting, or sidewise forces on the support compensated for, and a jack arrangement embodied in the support.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A device for elevating that part of a vehicle to which the steering wheels are attached comprising elevating means pivotally supported at that part of the vehicle on an axis laterally disposed to the longitudinal axis of the vehicle to swing on both sides of the vertical, said means being adapted to engage the ground to elevate that part of the vehicle, by backward or forward movement of the vehicle, depending upon which side of the vertical the elevating means is in engagement with the roadbed, said elevating means comprising a rotatable ground contact member, and means for absorbing the lateral motion of the vehicle during the elevating operation.

2. A device for elevating that part of a vehicle to which the steering wheels are attached comprising elevating means pivotally supported at that part of the vehicle on an axis laterally disposed to the longitudinal axis of the vehicle to swing on both sides of the vertical, said means being adapted to engage the ground to elevate that part of the vehicle, by backward or forward movement of the vehicle, depending upon which side of the vertical the elevating means is in engagement with the roadbed, said elevating means comprising a single support leg for one point suspension of the end of the vehicle and having a ground contact member rotatable with respect to the vehicle, and means for absorbing the lateral motion of the vehicle during the elevating operation.

3. A device for elevating that part of a vehicle to which the steering wheels are attached comprising elevating means pivotally supported at that part of the vehicle on an axis laterally disposed to the longitudinal axis of the vehicle to swing on both sides of the vertical, said means being adapted to engage the ground to elevate that part of the vehicle, by backward or forward movement of the vehicle, depending upon which side of the vertical the elevating means is in engagement with the roadbed, said elevating means being movable sidewise with respect to the vehicle.

4. A device for elevating that part of a vehicle to which the steering wheels are attached comprising elevating means pivotally supported at that part of the vehicle on an axis laterally disposed to the longitudinal axis of the vehicle to swing on both sides of the vertical, said means being adapted to engage the ground to elevate that part of the vehicle, by backward or forward movement of the vehicle, depending upon which side of the vertical the elevating means is in engagement with the roadbed, said elevating means being movable sidewise with respect to the vehicle and adapted to automatically recenter.

5. A device for elevating that part of a vehicle to which the steering wheels are attached comprising elevating means pivotally supported at that part of the vehicle on an axis laterally disposed to the longitudinal axis of the vehicle to swing on both sides of the vertical, said means being adapted to engage the ground to elevate that part of the vehicle, by backward or forward movement of the vehicle, depending upon which side of the vertical the elevating means is in engagement with the roadbed, said elevating means being movable sidewise and having a part rotatable with respect to that part attached to the vehicle.

6. A device for elevating that part of a vehicle to which the steering wheels are attached comprising elevating means pivotally supported at that part of the vehicle on an axis laterally disposed to the longitudinal axis of the vehicle to swing on both sides of the vertical, said means being adapted to engage the ground to elevate that part of the vehicle, by backward or forward movement of the vehicle, depending upon which side of the vertical the elevating means is in engagement with the roadbed, said elevating means being movable sidewise and adapted to automatically recenter under spring tension and having a part rotatable with respect to the part attached to the vehicle.

7. A device for elevating that part of a vehicle to which the steering wheels are attached comprising elevating means pivotally supported at that part of the vehicle on an axis laterally disposed to the longitudinal axis of the vehicle to swing on both sides of the vertical, said means being adapted to engage the ground to elevate that part of the vehicle, by backward or forward movement of the vehicle, depending upon which side of the vertical the elevating means is in engagement with the roadbed, said elevating means being extensible or retractable.

8. A parking device comprising a support for pivoting on the underside of a vehicle axle carrying the steering wheels, the support comprising a bar mounted for rotatable movement under the axle, corresponding arms mounted on the bar on each side of the longitudinal axis of the vehicle, a cross member connecting the lower ends of the arms and a ground contact member centrally fixed on the underside of the cross member, said arms being capable of movement on both sides of the vertical.

9. A parking device comprising a support for pivoting on the underside of a vehicle axle carrying the steering wheels, the support comprising a bar mounted for rotatable movement under the axle, corresponding arms slidably mounted on the bar on each side of the longitudinal axis of the vehicle, a cross member connecting the lower ends of the arms and a ground contact member centrally fixed on the underside of the cross member, said arms being capable of movement on both sides of the vertical.

10. A parking device comprising a support for pivoting on the underside of a verticle axle carrying the steering wheels, the support comprising a bar mounted for rotatable movement under the axle, corresponding extensible and retractable arms mounted on the bar on each side of the longitudinal axis of the vehicle, a cross member connecting the lower ends of the arms and a ground contact member centrally fixed on the underside of the cross member, said arms being capable of movement on both sides of the vertical.

11. A parking device comprising a support for pivoting on the underside of a vehicle axle carrying the steering wheels, the support comprising a bar mounted for rotatable movement under the axle, corresponding arms mounted on the bar on each side of the longitudinal axis of the vehicle, a cross member connecting the lower ends of the arms and a ground contact member centrally fixed on the underside of the cross member, said ground contact member being rotatable with respect to the cross member, said arms being capable of movement on both sides of the vertical.

12. A parking device comprising a support for pivoting on the underside of a vehicle axle carrying the steering wheels, the support comprising a bar mounted for rotatable movement under the axle, corresponding extensible and retractable arms slidably mounted on the bar against spring tension on each side of the longitudinal axis of the vehicle, a cross member connecting the lower ends of the arms and a ground contact member centrally fixed on the underside of the cross member, said ground contact member being rotatable with respect to the cross member.

13. A parking device comprising a support for mounting on the underside of a vehicle axle carrying the steering wheels, the support being mounted on each side of the longitudinal axis of the vehicle, movable sidewise and having a part rotatable with respect to the vehicle, a cable for lowering the support for elevation of one end of the vehicle thereon by backward or forward movement and an adjustable tensioned plunger mounted on the vehicle for contact by the support in the raised position to prevent rattling of the support and compensate for strains on the cable.

14. A parking device comprising a support, means on the support permitting it to be extended and contracted, and means associated with the support to compensate for twisting and sideways forces exerted thereon.

15. A parking device comprising a support, means for compensating for twisting and sideways forces exerted on the support, and a rotatable foot at the bottom of the support.

16. A parking device comprising a support, means on the support permitting it to be extended and contracted, means associated with the support to compensate for twisting and sideways forces exerted thereon, and a rotatable foot on the bottom of the support.

17. A parking device comprising a support, a pivot for the support permitting forward and backward movement thereof to elevate the vehicle, depending upon which side of the vertical the support engages the roadway, means permitting sideways shifting of the support, and a rotatable foot for the support.

18. A parking device comprising a support comprising a single leg, a pivot for the support permitting forward and backward movement thereof to elevate the vehicle, depending upon which side of the vertical the support engages the roadway, means permitting sideways shifting of the support, and a rotatable foot for the support.

19. A device for elevating that part of a vehicle to which the steering wheels are attached comprising elevating means pivotally supported at that part of the vehicle whereby it may swing on both sides of the vertical, said means being adapted to engage the ground to elevate that part of the vehicle by backward or forward movement of the vehicle, depending upon which side of the vehicle the elevating means is in engagement with the roadbed, said elevating means being extensible or retractible, and a rotatable foot for the bottom of the elevating means.

20. A device for elevating that part of a vehicle to which the steering wheels are attached comprising elevating means pivotally supported at that part of the vehicle to swing on both sides of the vertical, said means comprising a single leg adapted to engage the ground to elevate that part of the vehicle by backward or forward movement of the vehicle, depending upon which side of the vehicle the elevating means is in engagement with the roadbed, said elevating means being extensible and retractible, a rotatable foot for the bottom of the elevating means, and means permitting the elevating means to move to compensate for lateral forces exerted thereon while the vehicle is being driven on the elevating means.

JOHN LESTER BARR.